United States Patent
Yabe et al.

(10) Patent No.: US 12,463,480 B2
(45) Date of Patent: Nov. 4, 2025

(54) ROTATING ELECTRICAL MACHINE AND METHOD FOR MANUFACTURING SAME

(71) Applicant: Mitsubishi Electric Corporation, Tokyo (JP)

(72) Inventors: Mitoru Yabe, Tokyo (JP); Junya Suzuki, Tokyo (JP); Hideya Nishikawa, Tokyo (JP); Masafumi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 321 days.

(21) Appl. No.: 18/003,361

(22) PCT Filed: Aug. 3, 2020

(86) PCT No.: PCT/JP2020/029678
§ 371 (c)(1),
(2) Date: Dec. 27, 2022

(87) PCT Pub. No.: WO2022/029842
PCT Pub. Date: Feb. 10, 2022

(65) Prior Publication Data
US 2023/0246497 A1  Aug. 3, 2023

(51) Int. Cl.
*H02K 1/28* (2006.01)
*H02K 1/278* (2022.01)

(52) U.S. Cl.
CPC ............... *H02K 1/28* (2013.01); *H02K 1/278* (2013.01)

(58) Field of Classification Search
CPC .................................. H02K 1/28; H02K 1/278
See application file for complete search history.

(56) References Cited

U.S. PATENT DOCUMENTS

2008/0048517 A1  2/2008  Ochiai et al.
2013/0257184 A1  10/2013  Haga et al.
(Continued)

FOREIGN PATENT DOCUMENTS

CN      110971034 A    4/2020
JP    2006-304407 A   11/2006
(Continued)

OTHER PUBLICATIONS

Communication dated Aug. 8, 2023 issued by the European Patent Office in application No. 20948697.6.
(Continued)

*Primary Examiner* — Forrest M Phillips
(74) *Attorney, Agent, or Firm* — Sughrue Mion, PLLC

(57) ABSTRACT

This rotating electrical machine includes: a rotor formed from stacked steel sheets and fixed to a rotary shaft; a plurality of magnets arranged on the outer circumference of the rotor along the circumferential direction; and the same number of holders as the magnets, the holders being arranged between the magnets. The holder is press-fitted and fixed into the rotor by a press-fit portion extending in the radial direction of the rotary shaft. One circumferential-direction side of the magnet is positioned by the rotor, and another side is pressed in the circumferential direction by the holder. Both circumferential-direction ends of the magnet are pressed in the radial direction by the holders. Such a configuration provides a rotating electrical machine that enables a magnet to be accurately fixed to a rotor through simple work, at low cost.

10 Claims, 18 Drawing Sheets

(56) References Cited

U.S. PATENT DOCUMENTS

| | | | |
|---|---|---|---|
| 2021/0075279 A1 | 3/2021 | Ichien et al. | |
| 2022/0166297 A1* | 5/2022 | Huang | H02K 1/274 |
| 2022/0181959 A1* | 6/2022 | Takahashi | H02K 21/22 |
| 2024/0339877 A1* | 10/2024 | Koa | H02K 1/278 |
| 2024/0356407 A1* | 10/2024 | Nakayama | H02K 15/16 |
| 2024/0413711 A1* | 12/2024 | Joshi | H02K 5/203 |

FOREIGN PATENT DOCUMENTS

| | | |
|---|---|---|
| JP | 5044217 B2 | 10/2012 |
| JP | 2013-162691 A | 8/2013 |
| JP | 2013-162692 A | 8/2013 |
| JP | 5842365 B2 | 1/2016 |
| KR | 10-2007-0113726 A | 11/2007 |
| WO | 2010/133496 A1 | 11/2010 |
| WO | 2019/189729 A1 | 10/2019 |

OTHER PUBLICATIONS

Japanese Office Action dated Aug. 29, 2023 in Application No. 2022-541340.
Communication dated Feb. 13, 2024 issued by the European Patent Office in application No. 20948697.6.
Office Action issued Jun. 4, 2024 in European Application No. 20 948 697.6.
International Search Report for PCT/JP2020/029678 dated Sep. 1, 2020.
Office Action issued Jan. 23, 2025 in European Patent Application No. 20 948 697.6.
Chinese Office Action dated Apr. 7, 2025 in Application No. 202080104890.4.
Office Action issued Jul. 26, 2025 in Chinese Patent Application No. 20208014890.4.

* cited by examiner

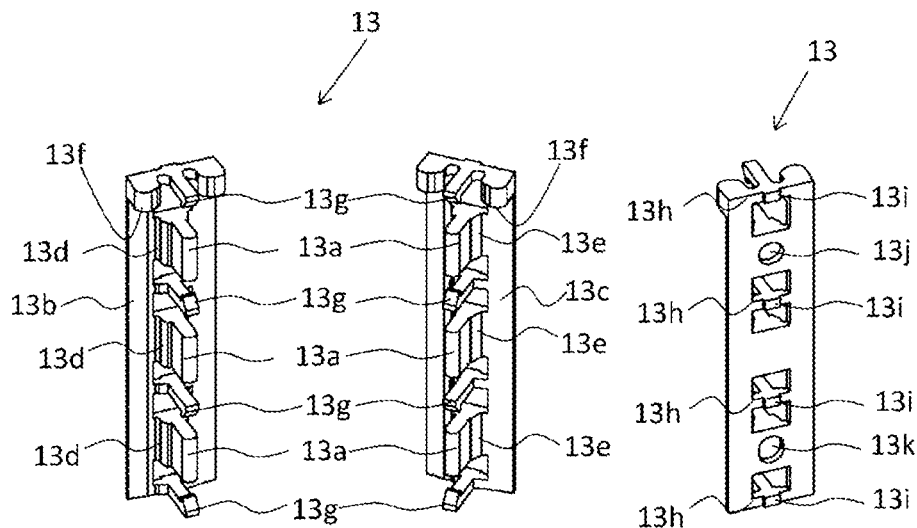
FIG.15A  FIG.15B
FIG.16
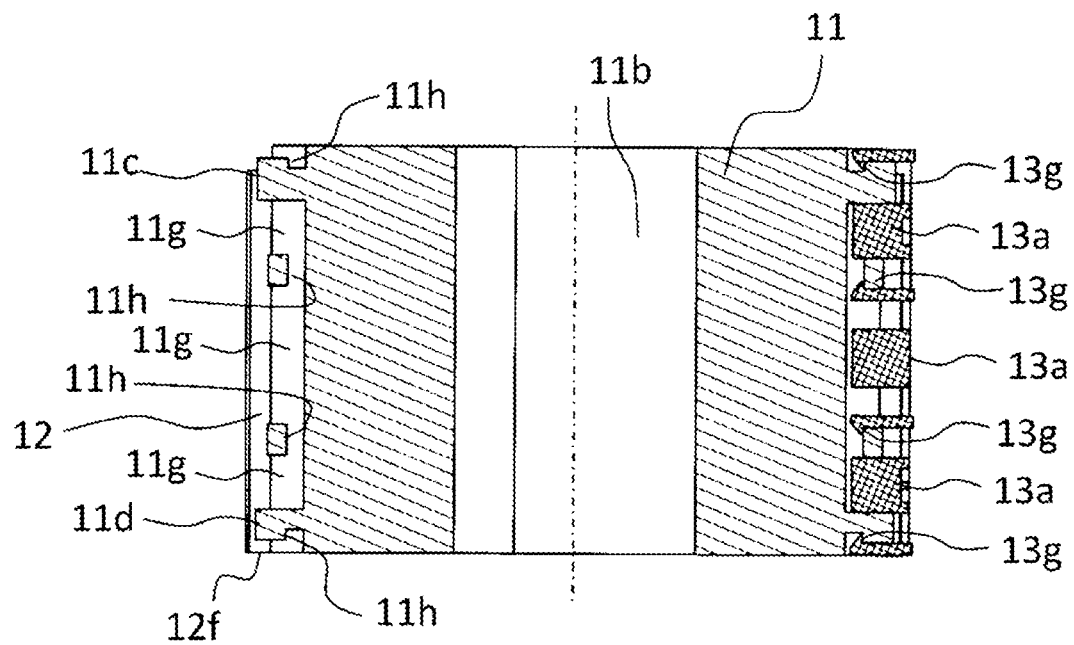

ROTATING ELECTRICAL MACHINE AND METHOD FOR MANUFACTURING SAME

CROSS REFERENCE TO RELATED APPLICATIONS

This application is a National Stage of International Application No. PCT/JP2020/029678 filed Aug. 3, 2020.

TECHNICAL FIELD

The present disclosure relates to a rotating electrical machine and a method for manufacturing the same.

BACKGROUND ART

Conventionally, in a rotating electrical machine in which a rotor unit with magnets fixed thereto rotates on the inner side of a coil, a configuration in which a plurality of magnets are fixed to a rotor by a magnet holder made of resin, without using an adhesive, is known. For example, Patent Document 1 discloses that a magnet holder is insert-molded with a rotor formed from stacked steel sheets and magnets are press-fitted and fixed between magnet holder parts from a rotary shaft direction.

In addition, Patent Document 2 discloses that a magnet holder molded with resin is fixed to a rotor, and from a rotary shaft direction, a magnet is press-fitted and fixed into a magnet storage portion formed by the magnet holder and the outer circumferential surface of the rotor.

CITATION LIST

Patent Document

Patent Document 1: Japanese Patent No. 5842365
Patent Document 2: Japanese Patent No. 5044217

SUMMARY OF THE INVENTION

Problems to be Solved by the Invention

However, the configuration of Patent Document 1 in which the magnet holder is insert-molded with the rotor in advance requires a complicated and expensive mold for insert molding, so that equipment investment increases and the product cost inevitably increases.

In the configuration of Patent Document 2 in which the integrated-type magnet holder is fixed to the rotor and a magnet is press-fitted and fixed into the magnet storage portion formed by the magnet holder and the outer circumferential surface of the rotor, attachment error of the rotor, molding error of the magnet holder, and assembly error such as deformation of the magnet holder due to assembly are added, thus causing a problem that variation in arrangement accuracy of magnets increases.

In particular, if position accuracy in the circumferential direction of the rotary shaft varies, torque ripple and cogging torque occur, leading to deterioration in performance of the rotating electrical machine. Further, a magnet needs to be press-fitted and fixed into the magnet storage portion formed by the magnet holder and the outer circumferential surface of the rotor, from the rotary shaft direction. Therefore, workability in assembling is low and the magnet and the magnet holder might be grazed at the time of press-fitting, leading to occurrence of rust, accuracy deterioration, or the like.

The present disclosure has been made to solve the above problem, and an object of the present disclosure is to provide a rotating electrical machine that enables improvement in assembly accuracy and reduction in torque ripple and cogging torque without the need of a mold for insert molding.

Solution to the Problems

A rotating electrical machine according to the present disclosure includes: a rotor fixed to a rotary shaft; a plurality of magnets arranged on an outer circumference of the rotor; and holders arranged between the plurality of magnets and fixing the magnets. The rotor is provided with a positioning portion that positions each magnet, and a groove for press-fitting and fixing each holder. Each holder is provided with a press-fit portion press-fitted into the groove, and a pressing portion for fixing the magnet. By the press-fit portion being press-fitted into the groove, the pressing portion presses and fixes an end of the magnet positioned by the positioning portion.

Effect of the Invention

The rotating electrical machine according to the present disclosure does not require a complicated and expensive mold for insert molding, does not cause damage to the magnet and the magnet holder at the time of press-fitting, and enables improvement in assembly accuracy, thus obtaining characteristics in which torque ripple and cogging torque are small.

BRIEF DESCRIPTION OF THE DRAWINGS

FIG. 15 FIG. 15A and 15B are perspective views of the magnet holder of the rotating electrical machine according to embodiment 2.

FIG. 16 is a sectional view along line D-D in FIG. 12 according to embodiment 2.

FIG. 20 FIG. 20A and 20B are perspective views of a magnet holder according to embodiment 3.

DESCRIPTION OF EMBODIMENTS

Embodiment 1

Figure 1:
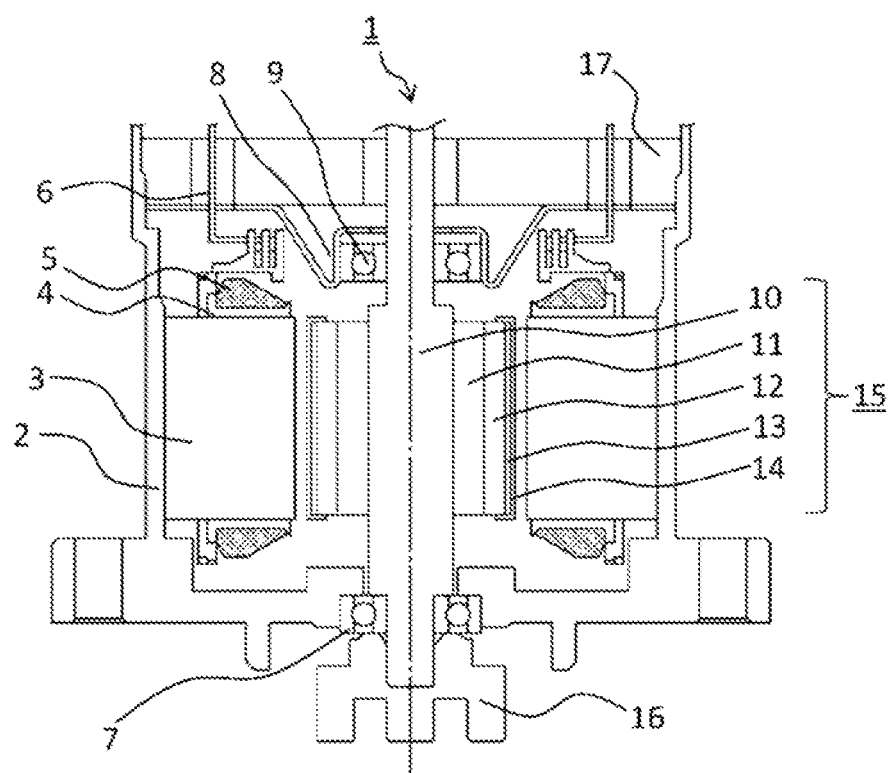
FIG. 1 is a sectional view of a rotating electrical machine according to embodiment 1.

Hereinafter, a preferred embodiment of a rotating electrical machine according to the present disclosure will be described with reference to the drawings. The same or corresponding matters and parts are denoted by the same reference characters and the detailed description thereof is omitted. Also in the other embodiments, components denoted by the same reference characters will not be repeatedly described.

The present disclosure is not limited to the description below, and modification can be made as appropriate without deviating from the scope of the present disclosure. In the drawings, for facilitating the understanding, the scales of members may be different from actual ones and components irrelevant to features of the present disclosure are not shown.

With reference to FIG. 1 to FIG. 11, a rotating electrical machine according to embodiment 1 of the present disclosure will be described.

The present embodiment shows an example in which the rotating electrical machine is applied to electric power steering mounted to a vehicle. In order to assist a steering force of the steering of the vehicle, a control device is also needed in addition to the rotating electrical machine itself, but the control device is not shown in the drawings. FIG. 1 is a sectional view illustrating the configuration of the rotating electrical machine.

A frame 2 which is a housing of a rotating electrical machine 1 is formed in substantially a cylindrical shape having an opening on the rear side (upper side in the drawing), and is made of an aluminum alloy which is inexpensive and light. A stator 3 is formed by stacking electromagnetic steel sheets and is fixed to the frame 2. The stator 3 has a stator winding 5 wound therearound while an insulator 4 which is an insulating material is interposed therebetween, and is provided with a terminal 6 for supplying the stator winding 5 with current from the control device (not shown) provided on the rear side. In the frame 2, a bearing 7 is fixed on the front side and a bearing 9 is fixed on the rear side via a bearing holder 8.

A rotor 11 formed by stacking electromagnetic steel sheets is fixed to a rotor shaft 10, a plurality of magnets 12 are fixed at the outer circumference of the rotor 11 by magnet holders 13, and these are covered by a nonmagnetic protection tube 14, thus forming a rotor unit 15. The rotor shaft 10 is rotatably supported by the bearing 7 and the bearing 9, and the rotor unit 15 is provided so as to be surrounded by the stator 3 separately therefrom.

A joint 16 for attachment to the vehicle side is provided on the front side (lower side in the drawing) of the rotor shaft 10, and a rotation angle detection sensor for detecting the rotation state of the rotor 11 is provided at a part (not shown) on the rear side of the rotor shaft 10.

A heatsink 17 at which the control device (not shown) is provided is fixed at a rear-side opening end of the frame 2. The control device includes a power conversion circuit having a power semiconductor for converting DC current from outside, and a control circuit, and supplies desired current to the stator winding 5 via the terminal 6. Thus, a rotational force is generated on the rotor 11, so that the rotor unit 15 and therefore the joint 16 are rotated.

Next, the configuration of the rotor unit 15 of the present embodiment will be described in detail.

Figure 2:
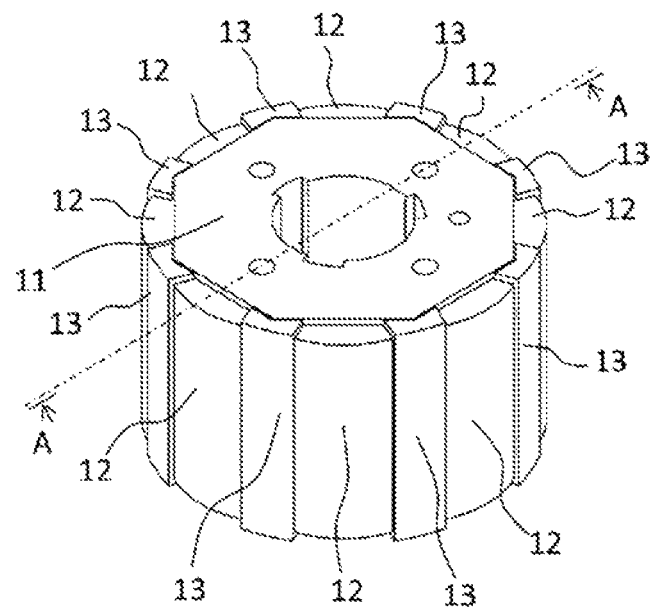
FIG. 2 is a perspective view showing an assembled state of a rotor, magnets, and magnet holders of the rotating electrical machine according to embodiment 1.
Figure 3:
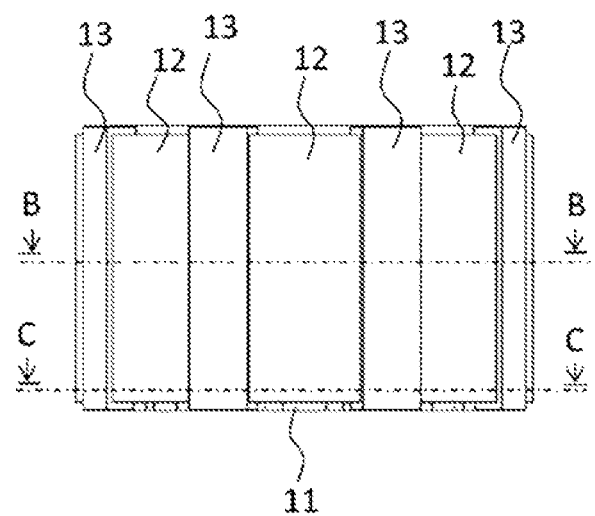
FIG. 3 is a side view showing an assembled state of the rotor, the magnets, and the magnet holders of the rotating electrical machine according to embodiment 1.

FIG. 2 and FIG. 3 are a perspective view and a side view showing an assembled state of the rotor 11, the magnets 12, and the magnet holders 13. A plurality of magnets 12 are arranged at equal intervals around the outer circumference of the rotor 11, and between the magnets 12, the same number of magnet holders 13 as the magnets 12 are arranged for fixing and retaining the magnets 12.

Figure 4:
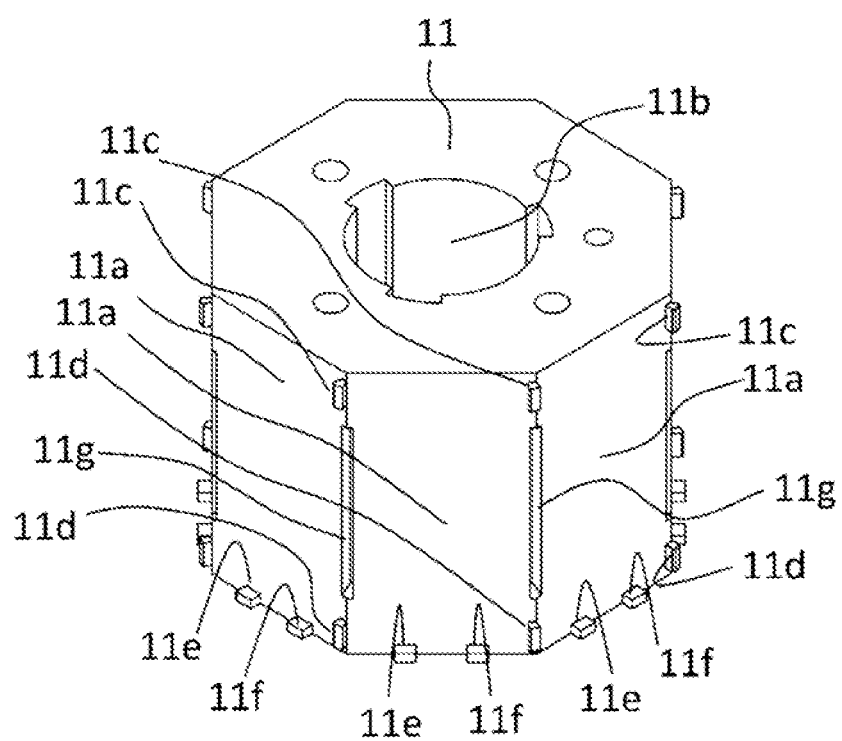
FIG. 4 is a perspective view of the rotor of the rotating electrical machine according to embodiment 1.

FIG. 4 is a perspective view of the rotor 11. The rotor 11 is formed from stacked steel sheets which are a plurality of electromagnetic steel sheets stacked in the up-down direction. In the present embodiment, the outer shape of the rotor 11 is substantially an octagonal prism shape having eight outer circumferential surfaces 11a, and the rotor 11 has, at the center, a through hole 11b for inserting the rotor shaft 10. Near upper and lower ends of the outer circumference, positioning bosses 11c, 11d for determining the positions of the magnets 12 in the circumferential direction, and positioning bosses 11e, 11f for determining the positions of the magnets 12 in the axial direction, are formed. Grooves 11g extending in the axial direction are formed between the magnets 12.

Figure 5:
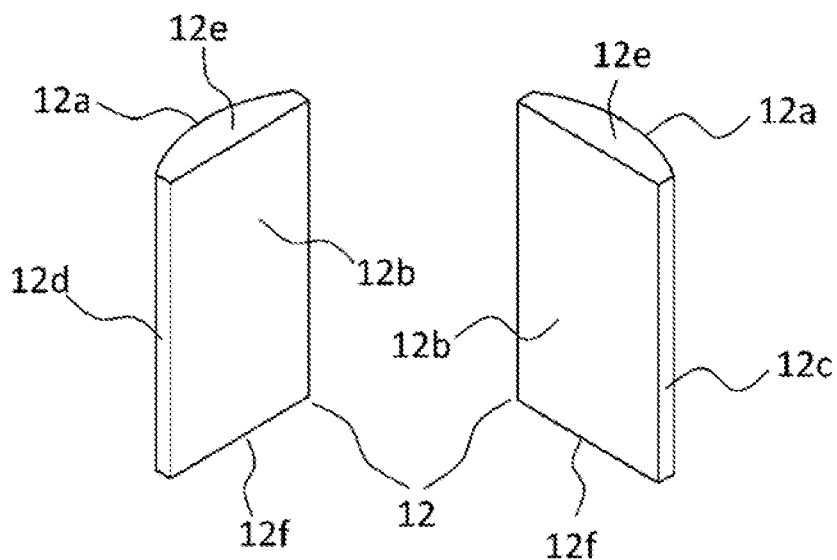
FIG. 5 is a perspective view of the magnet of the rotating electrical machine according to embodiment 1.

FIG. 5 is a perspective view of the magnet 12. The magnet 12 is, for example, a Nd—Fe—B based sintered magnet, and the surface thereof has a rust-proof coating. The magnet 12 has substantially a semi-cylindrical shape having one cylindrical surface 12a, a flat surface 12b opposed thereto, two side surfaces 12c, 12d, an upper surface 12e, and a lower surface 12f. The magnets 12 are arranged on the eight side surfaces of the rotor 11, at equal intervals in the circumferential direction of the rotor shaft 10.

Figure 6:
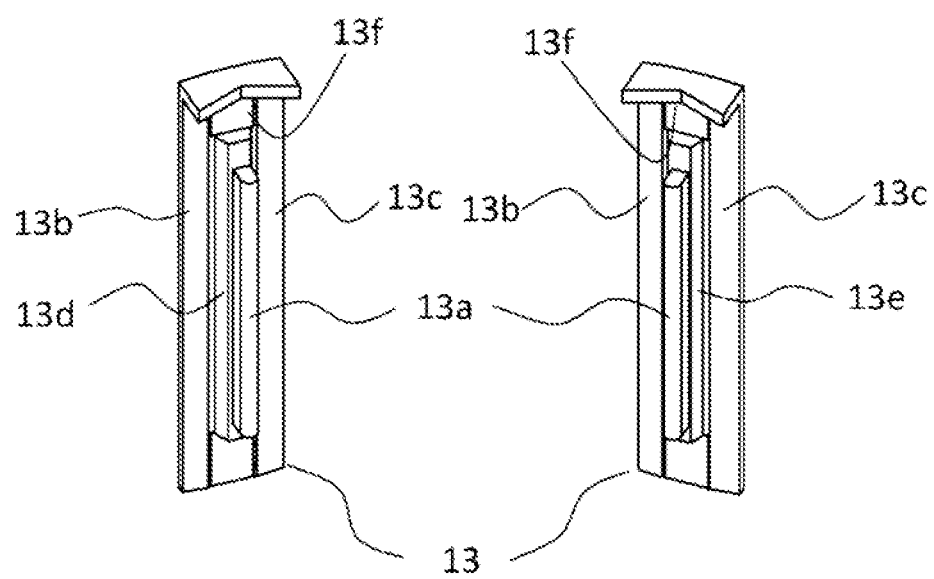
FIG. 6 is a perspective view of the magnet holder of the rotating electrical machine according to embodiment 1.

FIG. 6 is a perspective view of the magnet holder 13. The magnet holder 13 is a high-stiffness and elastic molded product of epoxy based resin, polyphenylene sulfide (PPS) based resin, or polybutylene terephthalate (PBT) based resin. The cross-section of the magnet holder 13 has substantially a T shape, and the magnet holder 13 has a press-fit portion 13a, and a first contact portion 13b and a second contact portion 13c for each pressing the cylindrical surface 12a of the magnet 12 in the radial direction. Further, the magnet holder 13 has a third contact portion 13d for pressing the side surface 12c of the magnet 12 in the circumferential direction, a non-contact portion 13e which does not contact with the side surface 12d of the magnet 12, and a fourth contact portion 13f for pressing the upper surface 12e of the magnet 12 in the axial direction.

Figure 7:
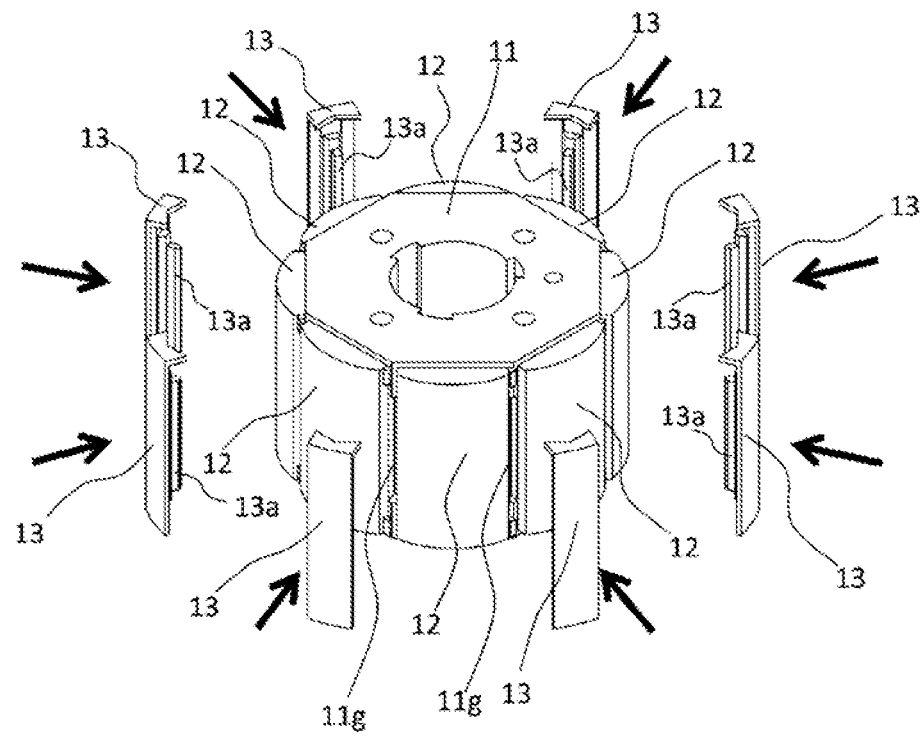
FIG. 7 is a perspective view showing a state before fixation by the magnet holders of the rotating electrical machine according to embodiment 1.

FIG. 7 is a perspective view showing a state before fixation by the magnet holders 13. For the rotor 11, eight magnets 12 are arranged and eight magnet holders 13 are moved in the radial direction (arrow direction) simultaneously, so as to press-fit the press-fit portions 13a into the grooves 11g of the rotor 11. Thus, the assembled state shown in FIG. 2 and FIG. 3 is obtained.

Figure 8:
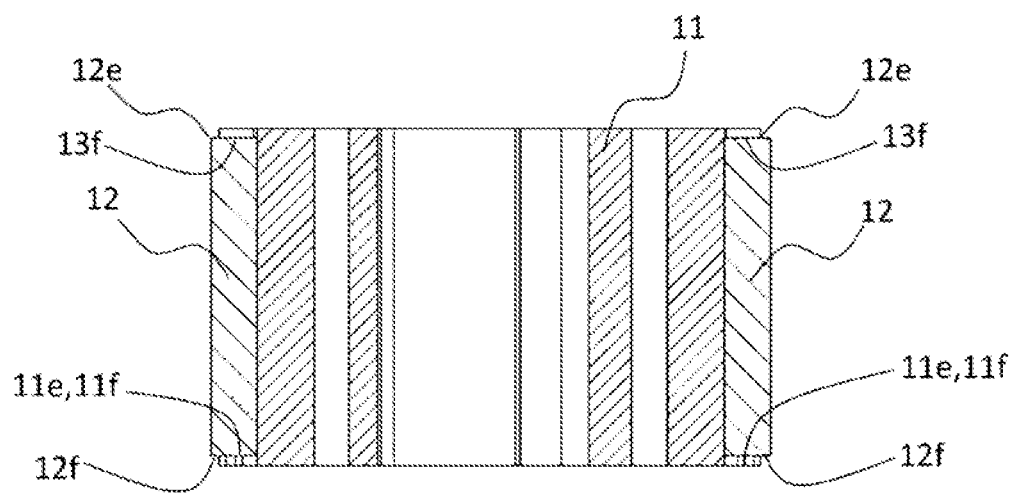
FIG. 8 is a sectional view along line A-A in FIG. 2 according to embodiment 1.
Figure 9:
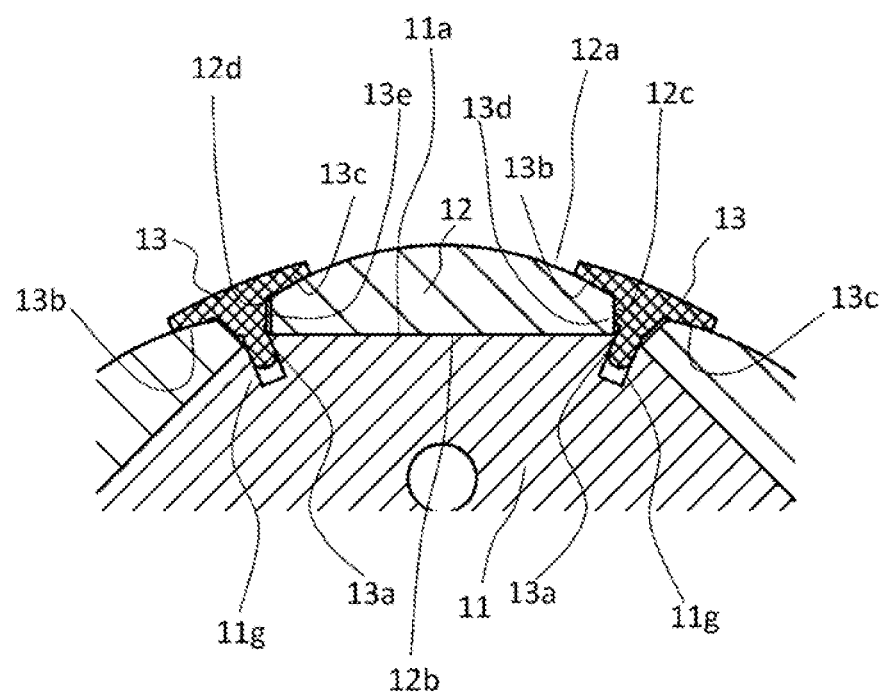
FIG. 9 is a partial enlarged sectional view along line B-B in FIG. 3 according to embodiment 1.
Figure 10:
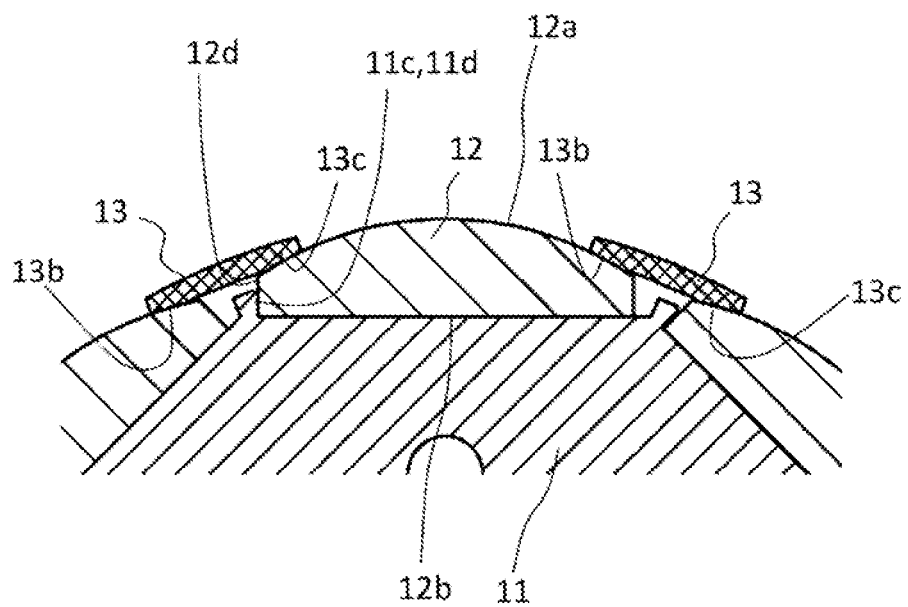
FIG. 10 is a partial enlarged sectional view along line C-C in FIG. 3 according to embodiment 1.

FIG. 8 is a sectional view along line A-A in FIG. 2. FIG. 9 and FIG. 10 are partial enlarged sectional views along line B-B and line C-C in FIG. 3, respectively. As shown in FIG. 8, the upper surface 12e of the magnet 12 is pressed by the fourth contact portion 13f of the magnet holder 13, and the lower surface 12f and the positioning bosses 11e, 11f of the rotor 11 contact with each other, whereby the magnet 12 is positioned and fixed.

As shown in FIG. 9 and FIG. 10, the cylindrical surface 12a of the magnet 12 is pressed by the first contact portion 13b and the second contact portion 13c of the magnet holders 13, and the flat surface 12b and the outer circumferential surface 11a of the rotor 11 contact with each other, whereby the magnet 12 is positioned and fixed. One side surface 12c of the magnet 12 is pressed by the third contact portion 13d of the magnet holder 13, and the other side surface 12d and the positioning bosses 11c, 11d of the rotor 11 contact with each other, whereby the magnet 12 is positioned and fixed. At this time, the non-contact portion 13e of the magnet holder 13 is separate from the side surface 12d of the magnet 12 without pressing the side surface 12d.

Here, in order that the magnet holder 13 will not come off from the rotor 11 after press-fitting, designing is made on the basis of a press-fit interference, a press-fit length, materials, and the like, whereby a necessary retention force is ensured. In the present embodiment, the magnet holder 13 is a molded product of resin, but may be a cast product of nonmagnetic metal such as aluminum or stainless steel, a product worked by cutting or pressing, or the like.

With the above configuration, it is possible to provide the magnet holder 13 with a reduced size and at low cost, without the need of a complicated and expensive mold. In addition, since each magnet holder 13 is press-fitted and fixed into the rotor 11 from the radial direction of the rotor shaft 10, it is possible to easily perform assembly without rubbing the magnet 12 against the rotor 11 and the magnet holder 13 when press-fitting the magnet 12.

During assembling, the magnet 12 need not be moved in the axial direction and the circumferential direction, and therefore assembly can be performed more easily. In addition, such a phenomenon in which the coating of the magnet 12 is removed so that rust occurs or the magnet holder 13 is grazed so that arrangement accuracy and a retention force for the magnets are deteriorated, does not happen.

Further, the magnets 12 are fixed with high accuracy depending on only accuracy of parts of the rotor 11 without being influenced by accuracy of parts of the magnet holders 13 and assembly accuracy of the magnet holders 13 and the rotor 11. Thus, a rotating electrical machine having favorable characteristics in which occurrence of torque ripple and cogging torque is suppressed can be provided.

In addition, since the magnet 12 is assuredly pressed by the first contact portion 13b and the second contact portion 13c of the magnet holders 13, the flat surface 12b is assuredly pressed against the outer circumferential surface 11a of the rotor 11 without backlash therebetween.

In the present embodiment, eight magnets 12 having a semi-cylindrical shape are used and the rotor 11 has substantially an octagonal prism shape. However, as a matter of course, the number of the magnets is not limited thereto, the shape thereof may be another shape such as a segment type, and also the rotor 11 may have another shape such as a cylindrical shape.

Figure 11:
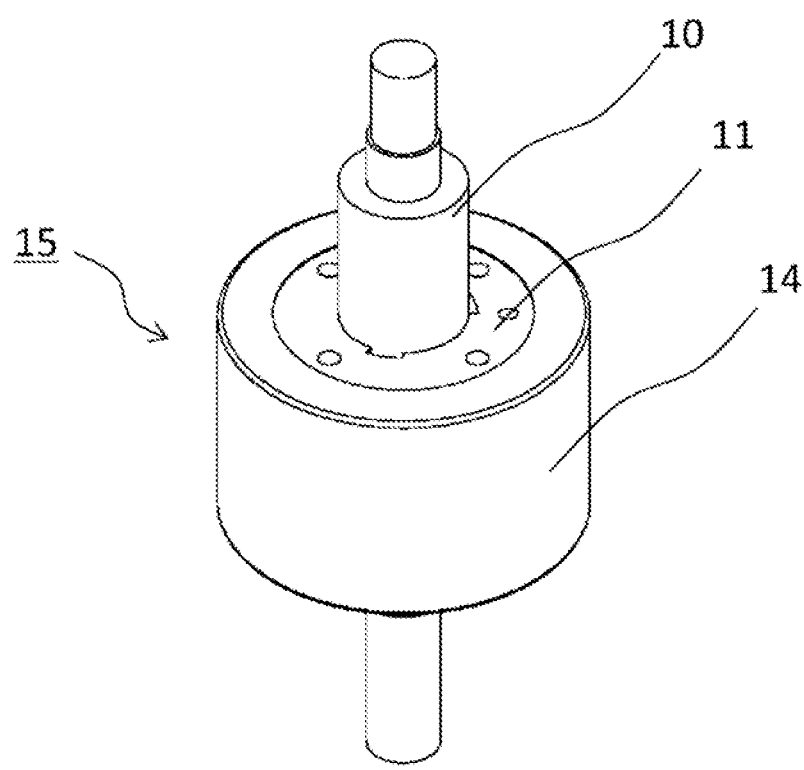
FIG. 11 is a perspective view of a rotor unit according to embodiment 1.

FIG. 11 is a perspective view of the rotor unit 15.

The protection tube 14 formed by deep drawing and made of a nonmagnetic material such as stainless steel or aluminum is externally fitted to the outer side of the magnet holders 13 fixed as described above. In the present embodiment, the outer circumference of the magnet holders 13 is set to be slightly greater than the outer circumference of the magnets 12. The protection tube 14 is fixed to the magnet holders 13 in a slightly press-fitted manner, and then end surfaces thereof are bent so as to be fixed in contact with the upper and lower surfaces of the magnet holders 13 or the rotor 11.

The rotor unit 15 may be formed without the protection tube 14, but the protection tube 14 is attached in order to prevent the rotor unit 15 from being locked when the magnet 12 cracks or comes off. In addition, the magnet holders 13 and the magnets 12 are fixed and retained more strongly by the protection tube 14. Finally, the rotor shaft 10 is press-fitted into the through hole 11b of the rotor 11, whereby the rotor unit 15 is completed.

In the present embodiment, the rotor shaft 10 is press-fitted and fixed after the magnets are fixed to the rotor 11. However, as a matter of course, the magnets 12 may be fixed through the above-described procedure after the rotor 11 is press-fitted and fixed to the rotor shaft 10.

As described above, the rotating electrical machine of embodiment 1 can be formed using a small-sized holder, and therefore a complicated and expensive mold for insert molding is not needed and an inexpensive holder can be used. In addition, since the positions of the magnets are determined with high accuracy depending on only accuracy of the rotor without being influenced by accuracy of the holders and assembly accuracy of the holders and the rotor, favorable characteristics in which torque ripple and cogging torque are reduced are obtained. Further, since each holder is fixed to the rotor from the radial direction of the rotary shaft, press-fitting work for the magnets is not needed and assembly can be easily performed. In addition, since the magnet is not grazed during assembling, an effect of obtaining a rotating electrical machine having high reliability without occurrence of rust and deterioration in accuracy, is provided.

Embodiment 2

Next, the configuration of the rotor unit 15 according to embodiment 2 will be described in detail, with reference to FIG. 12 to FIG. 16.

Figure 12:
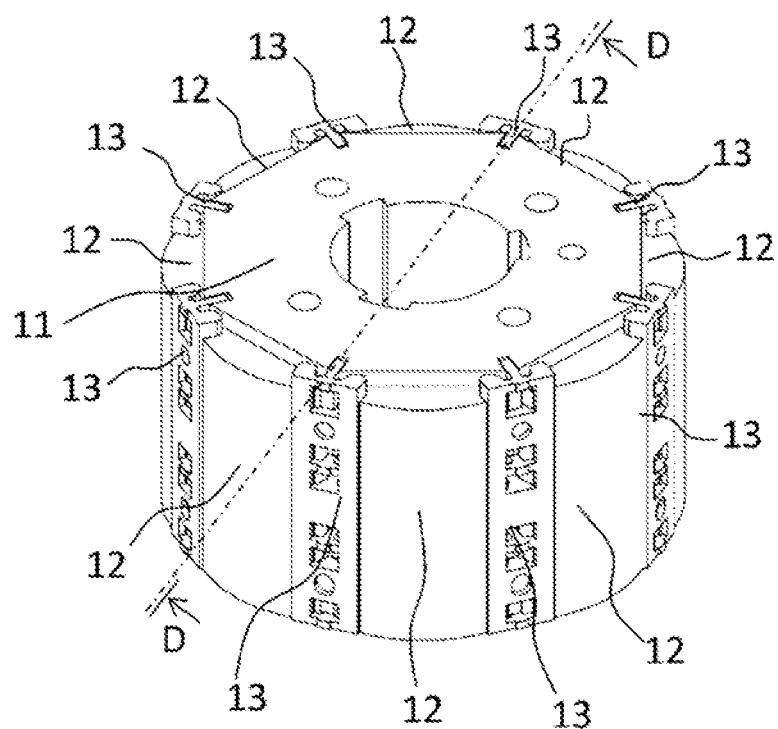
FIG. 12 is a perspective view showing an assembled state of a rotor, magnets, and magnet holders of a rotating electrical machine according to embodiment 2.
Figure 13:
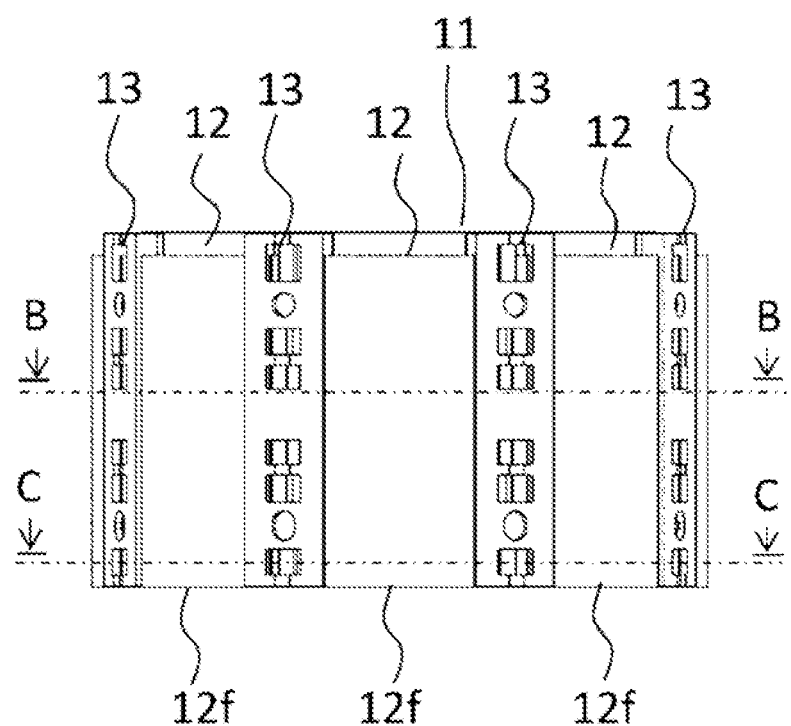
FIG. 13 is a side view showing an assembled state of the rotor, the magnets, and the magnet holders of the rotating electrical machine according to embodiment 2.
Figure 14:
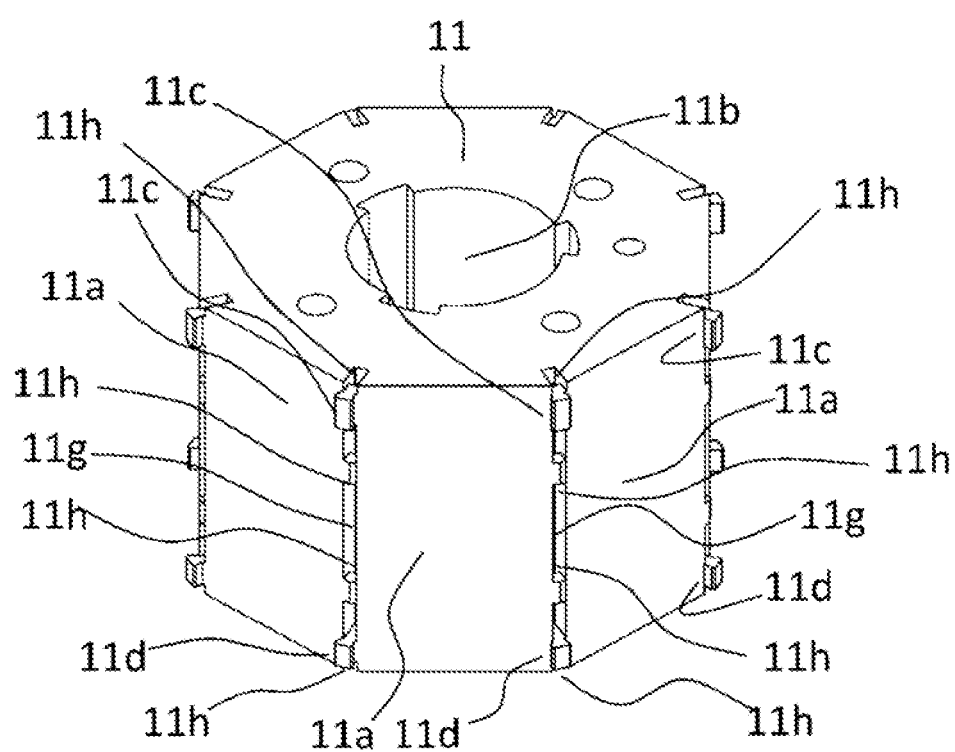
FIG. 14 is a perspective view of the rotor of the rotating electrical machine according to embodiment 2.

FIG. 12 and FIG. 13 are a perspective view and a side view showing an assembled state of the rotor 11, the magnets 12, and the magnet holders 13 in embodiment 2. FIG. 14 is a perspective view of the rotor 11, and FIG. 15A and FIG. 15B are perspective views of the magnet holder 13. The magnet 12 is the same as that in embodiment 1. Description of the same configurations and operations as those in embodiment 1 is omitted.

As shown in the front view in FIG. 15A, the magnet holder 13 has claw portions 13g at four locations that are upper and lower surfaces and locations therebetween. Thus, the press-fit portion 13a is divided into three parts, and the third contact portion 13d and the non-contact portion 13e are each divided into three parts. As shown in the back view in FIG. 15B, the base of the claw portion 13g is connected to the main body via a thin deflection portion 13h, and a projection 13i which projects relative to the surrounding back surface is formed in a central area of the deflection portion 13h. On the back side, recesses that are a hole 13j and an elongated hole 13k are formed.

Next, as shown in FIG. 14, engagement portions 11h to be engaged with the claw portions 13g of the magnet holder 13 are formed at four locations that are upper and lower surfaces of the rotor 11 and locations therebetween, for one magnet holder 13. FIG. 16 is a sectional view along line D-D in FIG. 12, and the left side with respect to the center shows only the rotor 11 with no magnet holder 13 attached, for facilitating the understanding of the structure of the engagement portions 11h. Since the rotor 11 is formed by stacking electromagnetic steel sheets in the up-down direction, there is no difficulty in forming such a complicated shape.

In the above structure, the configuration, method, and operation of positioning and fixation for the magnets 12 are the same as those in embodiment 1, and sectional views along line B-B and line C-C in FIG. 13 are also the same as FIG. 9 and FIG. 10. After the magnet holder 13 is press-fitted, the claw portions 13g of the magnet holder 13 are hooked on the engagement portions 11h of the rotor 11 as shown on the right side with respect to the center in FIG. 16. Thus, the retention force is further increased against a centrifugal force generated in the radial direction during rotation.

In embodiment 1, the axial-direction position of the magnet 12 is determined by the positioning bosses 11e, 11f of the rotor 11, whereas in the present embodiment, positioning is also made by engagement between the engagement portion 11h at the axial-direction end of the magnet 12 and the claw portion 13g at the axial-direction end, and therefore assembly is performed such that the lower surface of the rotor 11 and the lower surface 12f of the magnet are flush with each other. Here, positioning in the axial direction may be made by the positioning bosses 11e, 11f as in embodiment 1.

Figure 17:
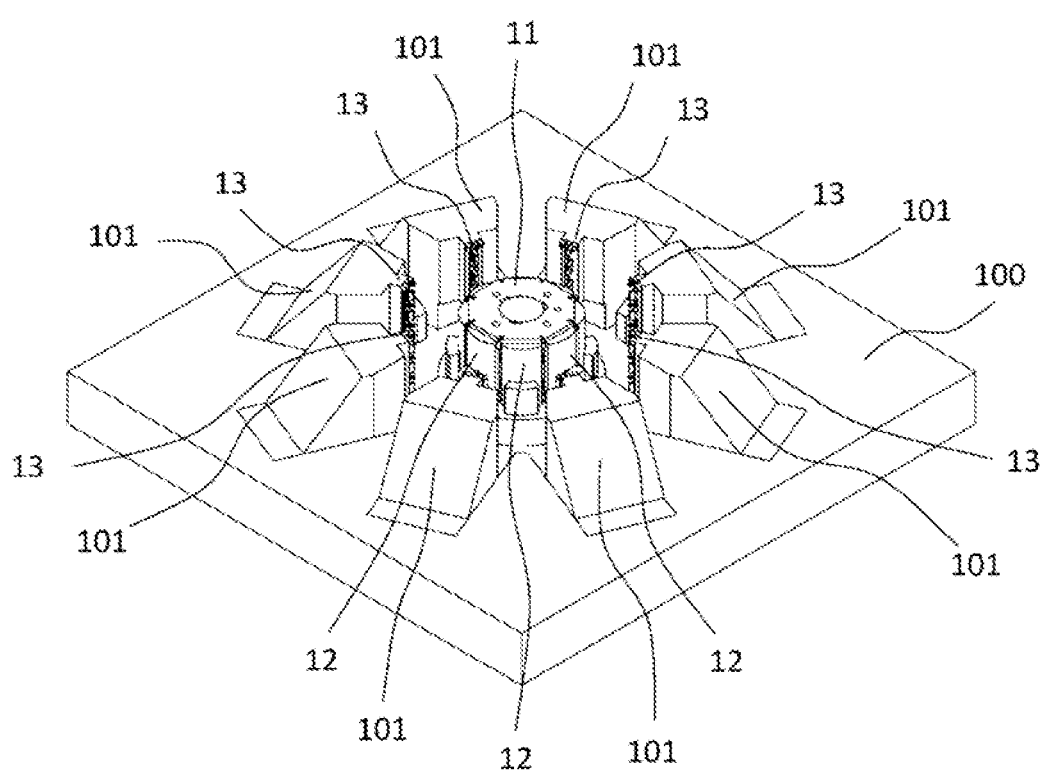
FIG. 17 is a perspective view showing a state before press-fitting of the magnet holders of the rotating electrical machine according to embodiment 2.
Figure 18:
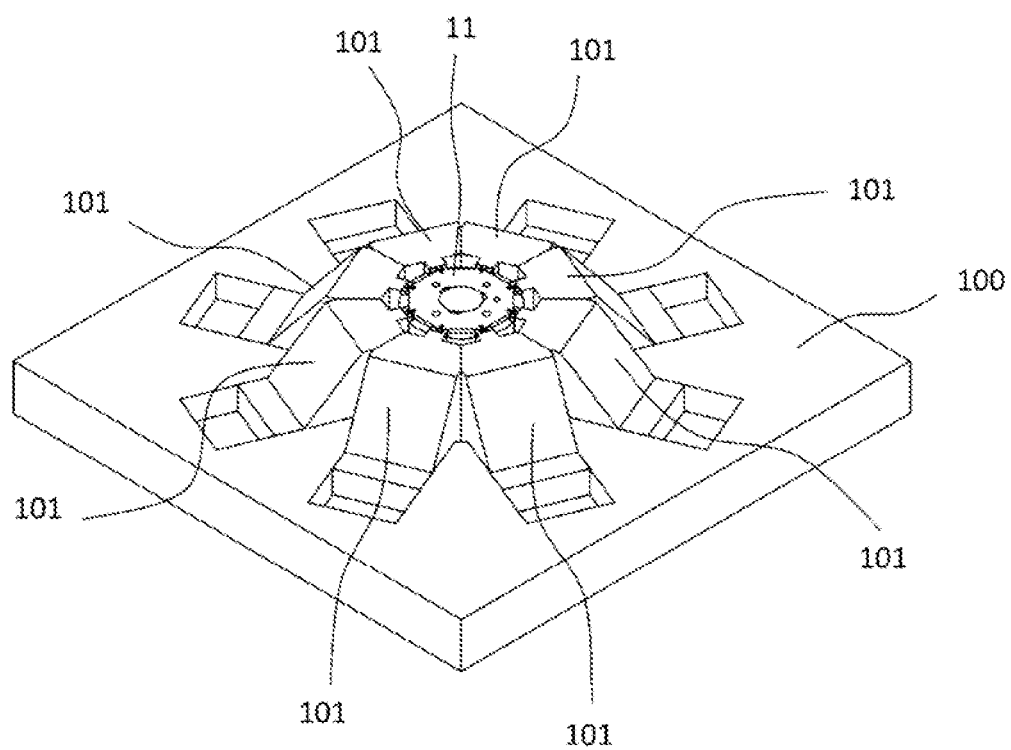
FIG. 18 is a perspective view showing a state after press-fitting of the magnet holders of the rotating electrical machine according to embodiment 2.

Next, the details of an assembly method will be specifically described with reference to FIG. 17 and FIG. 18. FIG. 17 shows a state before the magnet holders 13 are press-fitted, and FIG. 18 shows a state after the magnet holders 13 are press-fitted.

First, as shown in FIG. 17, the rotor 11 and eight magnets 12 are arranged at a fixed jig 100, and the magnet holders 13 are arranged at eight movable jigs 101, using the holes 13j and the elongated holes 13k (shown in FIG. 15B) as a reference.

By an upper die (not shown) descending, the eight movable jigs 101 are moved in the radial direction simultaneously, so that the press-fit portions 13a of the magnet holders 13 are press-fitted into the grooves 11g of the rotor 11. At the same time, the claw portions 13g of the magnet holders 13 contact with the rotor 11 and move while warping upward or downward. At this time, since the thin deflection portion 13h and the projection 13i projecting relative to the back surface are formed at the base of the claw portion 13g of the magnet holder 13, the claw portion 13g deflects also in the radial direction and thus is smoothly hooked on the engagement portion 11h of the rotor 11. When the magnet holder 13 is released from the movable jig 101, the claw portion 13g returns from its deflected state and is fixed to the engagement portion 11h of the rotor 11 without backlash.

With the above configuration and assembly method, the effects described in embodiment 1 are provided and in addition, come-off prevention in the radial direction can be achieved with simple work of inserting the magnet holder 13 from the radial direction, and thus stronger retention in the radial direction can be made without providing another part or another process. In the present embodiment, a mechanism for come-off prevention is made by the claw portion 13g, but as a matter of course, such a come-off prevention mechanism may be made by another process such as adhesion, crimping, screw fastening, or pin fastening. The configuration and assembly method of the rotor unit 15 are the same as those in embodiment 1.

Embodiment 3

In embodiment 3, a case where the magnet attachment structure in embodiment 2 is applied to a rotor unit 15 of a step-skew type will be described.

Figure 19:
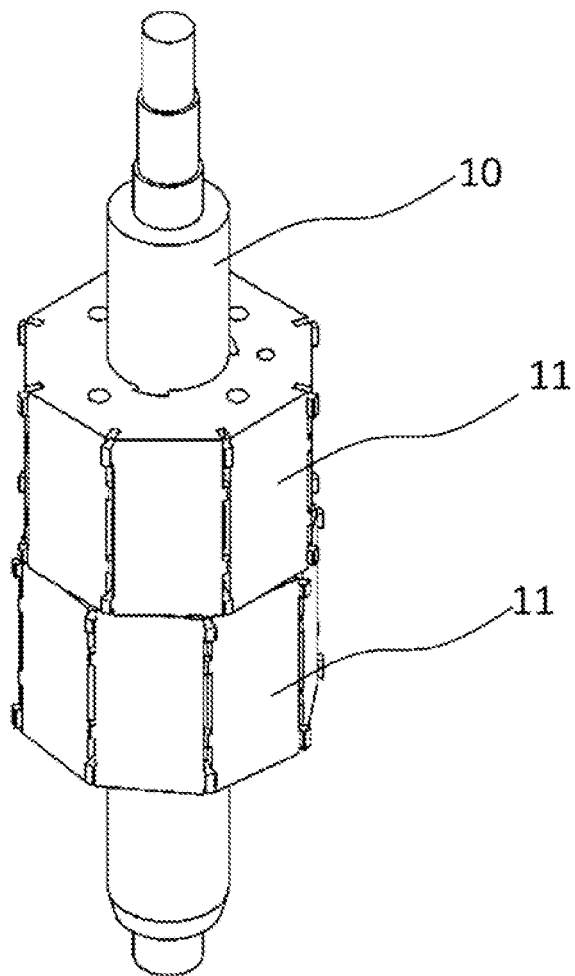
FIG. 19 is a perspective view showing assembly of a rotor and a rotor shaft according to embodiment 3.

As shown in FIG. 19, in the present embodiment, two rotors 11 are shifted from each other by a predetermined angle (several degrees) in the circumferential direction, and are stacked at two stages in the axial direction. These two rotors 11 are press-fitted and fixed to the rotor shaft 10. Then, the magnets 12 are fixed to the above two rotors 11 by the magnet holders 13.

Figures 20A, 20B:
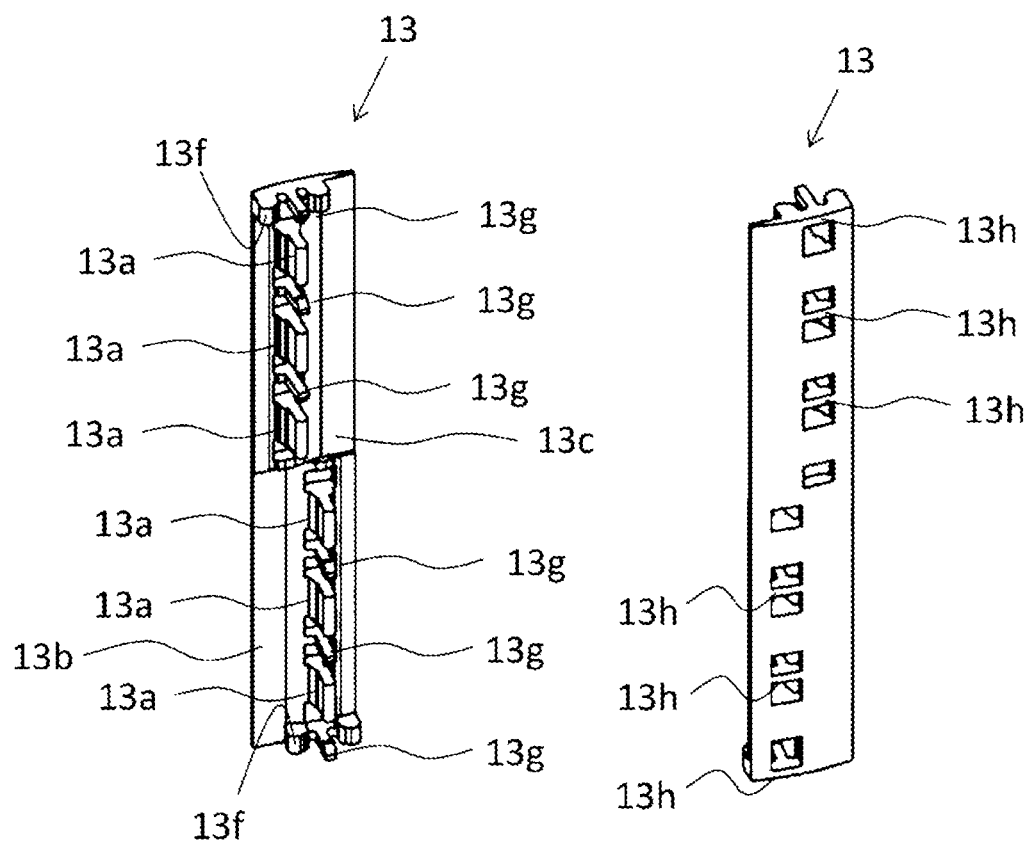
Figure 21:
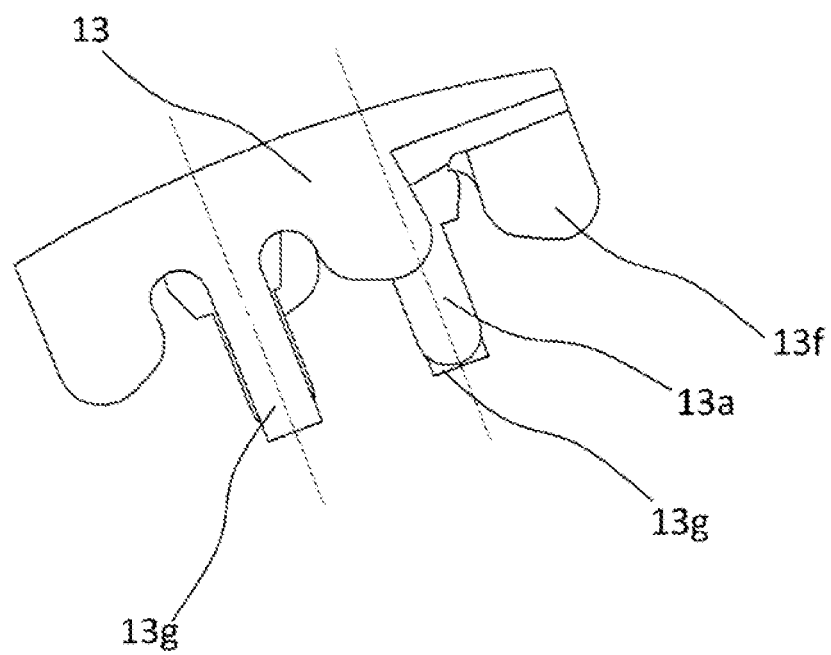
FIG. 21 is a top view of the magnet holder according to embodiment 3.
Figure 22:
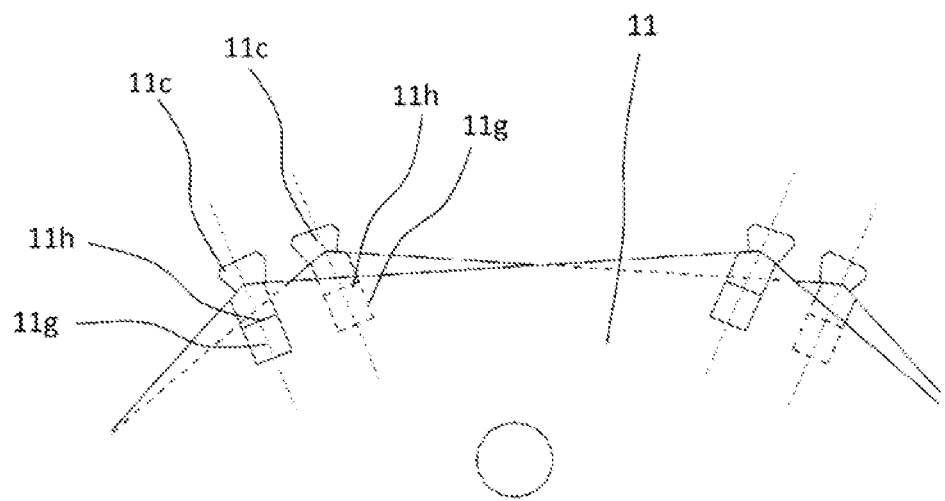
FIG. 22 is a top view of the rotor according to embodiment 3.

FIG. 20A and FIG. 20B are perspective views of the magnet holder (FIG. 20A is a front view and FIG. 20B is a back view). This magnet holder has such a shape that two magnet holders in embodiment 2 are shifted from each other by a predetermined angle in the circumferential direction as with the rotor 11 and are stacked in the axial direction so as to be integrally formed. FIG. 21 and FIG. 22 are a top view of the magnet holder 13 and a top view (partial enlarged view) of the rotor 11, respectively. The press-fit portions 13a and the claw portions 13g of the magnet holder 13 are formed to be parallel on the upper side and the lower side of the axial-direction stacked shape, and the grooves 11g and the grooves of the engagement portions 11h of the rotor 11 are also formed to be parallel on the upper side and the lower side of the axial-direction stacked shape.

Figure 23:
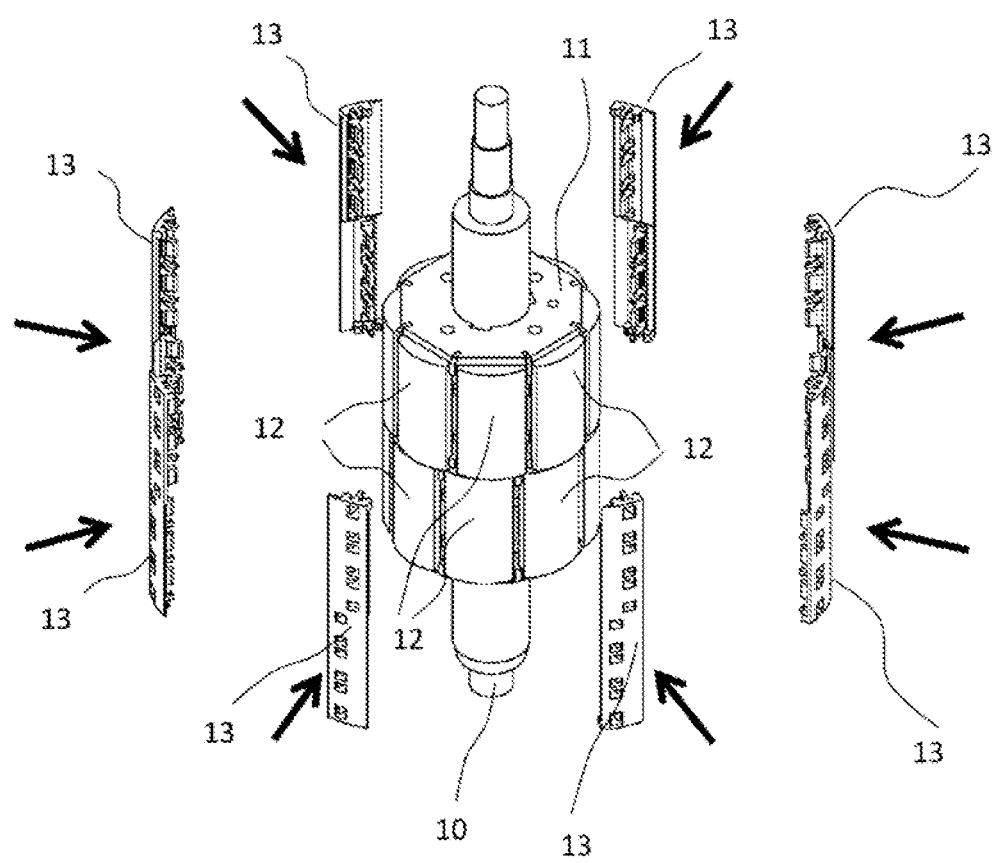
FIG. 23 is a perspective view showing a state before press-fitting of the magnet holders according to embodiment 3.

Thus, the magnet holder 13 can be smoothly press-fitted into the rotor 11 from the radial direction. Assembly is performed in the same manner as in embodiment 1 and embodiment 2, that is, as shown in FIG. 23, in a state in which all the magnets 12 are set to the rotor, the magnet holders 13 are moved in the radial direction simultaneously so as to be press-fitted, thus completing assembly.

Figure 24:
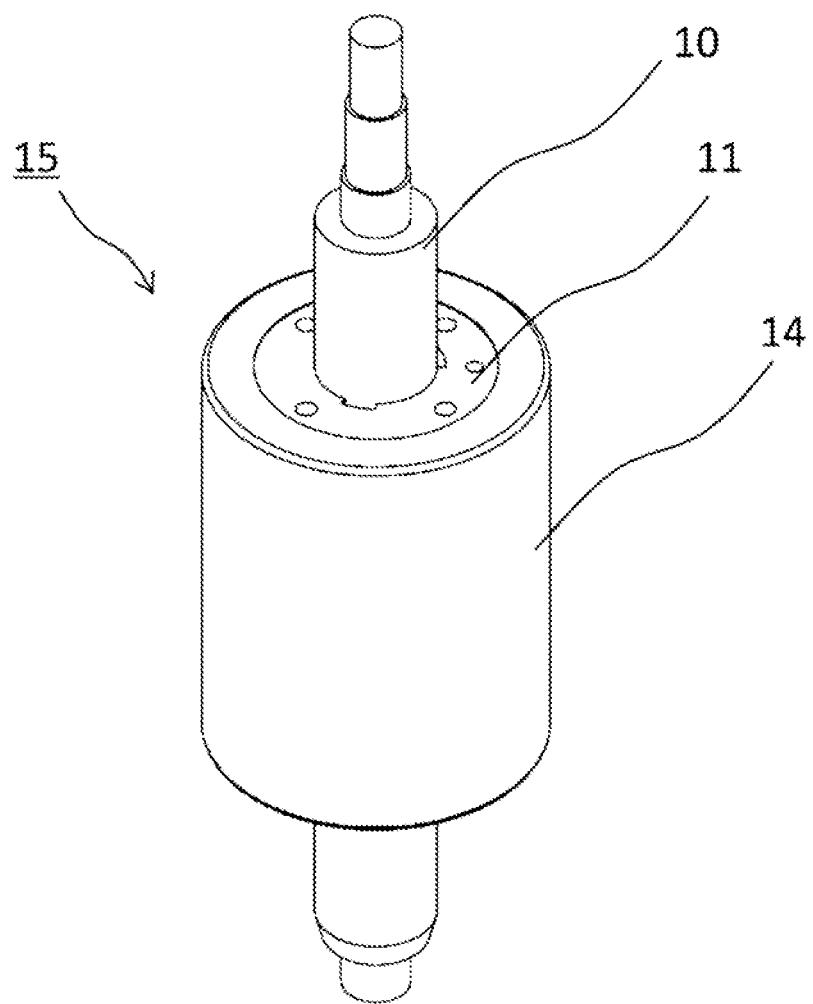
FIG. 24 is a perspective view of a rotor unit according to embodiment 3.

Thereafter, as shown in FIG. 24, as in embodiment 1, the protection tube 14 is fixed to the magnet holders 13 in a slightly press-fitted manner, and then end surfaces thereof are bent so as to be fixed in contact with the upper and lower surfaces of the magnet holders 13 or the rotor 11, whereby the rotor unit 15 is completed. In the present embodiment, the two rotors 11 shifted from each other by a predetermined angle (several degrees) in the circumferential direction and stacked in the axial direction are press-fitted and fixed to the rotor shaft 10. However, as a matter of course, a product in which the rotors 11 are shifted from each other by a predetermined angle (several degrees) in the circumferential direction may be manufactured as an integrated unit in advance, and then as in embodiments 1 and 2, the magnets 12 may be fixed and the resultant unit may be fixed to the rotor shaft 10. Since the rotors 11 are formed by stacking electromagnetic steel sheets in the up-down direction, there is no difficulty in forming such a complicated shape.

As described above, in the present embodiment, the rotor unit 15 of a step-skew type can be assembled with one work of press-fitting the magnet holders 13 from the radial direction, without increasing the numbers of the rotors 11 and the magnet holders 13. Thus, a rotating electrical machine that can be easily assembled and has high accuracy can be provided at low cost. Further, the effects described in embodiments 1 and 2 can be provided.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotating electrical machine
2 frame
3 stator
4 insulator
5 stator winding
6 terminal
7 bearing
8 bearing holder
9 bearing
10 rotor shaft
11 rotor
11a outer circumferential surface
11b through hole
11c, 11d positioning boss
11e, 11f positioning boss
11g groove
11h engagement portion
12 magnet
13 magnet holder
13a press-fit portion
13b first contact portion
13c second contact portion
13d third contact portion
13e non-contact portion
13f fourth contact portion
13g claw portion
13h deflection portion
13i projection
13j hole
13k elongated hole
14 protection tube
15 rotor unit
16 joint
17 heatsink
100 fixed jig
101 movable jig

The invention claimed is:

1. A rotating electrical machine comprising:
a rotor fixed to a rotary shaft;
a plurality of magnets arranged on an outer circumference of the rotor; and
holders arranged between each of the plurality of magnets and fixing the magnets such that each of the plurality of magnets contacts two of the holders, wherein
the rotor is provided with a positioning portion that positions each magnet, and a groove for press-fitting and fixing each holder,
each holder is provided with a press-fit portion press-fitted into the groove, and a pressing portion for fixing the magnet, and
by the press-fit portion being press-fitted into the groove, the pressing portion presses and fixes an end of the magnet positioned by the positioning portion.

2. The rotating electrical machine according to claim 1, wherein
the positioning portion is engaged with one circumferential-direction end of the magnet,
the pressing portion is formed on a circumferential-direction side of the press-fit portion, and
by the press-fit portion being press-fitted into the groove, the pressing portion presses, in a circumferential direction and a radial direction, another circumferential-direction end of the magnet that is not engaged with the positioning portion.

3. The rotating electrical machine according to claim 2, wherein
the pressing portion presses, in the radial direction, the end of the magnet that is engaged with the positioning portion.

4. The rotating electrical machine according to claim 1, wherein
the positioning portion is formed at one axial-direction end and engaged with the magnet,
the pressing portion is formed on an axial-direction side of the holder, and
by the press-fit portion being press-fitted into the groove, the pressing portion presses, in an axial direction, another axial-direction end of the magnet that is not engaged with the positioning portion.

5. The rotating electrical machine according to claim 1, wherein
the holder is provided with come-off prevention means for preventing coming off in a radial direction.

6. The rotating electrical machine according to claim 5, wherein
the come-off prevention means is formed by a claw portion extending from a flexible portion formed integrally with the holder, the flexible portion being elastically displaceable in the radial direction.

7. The rotating electrical machine according to claim 6, wherein
the press-fit portion and the claw portion of the holder extend in parallel as seen from the rotary shaft direction.

8. The rotating electrical machine according to claim 1, wherein
the magnets are stacked at a plurality of stages in the rotary shaft direction, and are arranged so as to be shifted from each other in a circumferential direction between the respective stages.

9. The rotating electrical machine according to claim 8, wherein the magnets stacked in an axial direction are integrally fixed by the holder.

10. A method for manufacturing the rotating electrical machine according to claim 1, wherein a plurality of the holders are attached to the rotor simultaneously.

\* \* \* \* \*